United States Patent [19]
Davis

[11] Patent Number: 5,315,965
[45] Date of Patent: May 31, 1994

[54] AQUATIC FUR-BEARING MAMMAL AND BIRD VIVARIUM

[76] Inventor: Randall W. Davis, Dept. Marine Biology, Texas A & M University, P.O. Box 1675, Galveston, Tex. 77553

[21] Appl. No.: 891,755

[22] Filed: Jun. 1, 1992

[51] Int. Cl.⁵ .................... A01K 1/00; A01K 63/00
[52] U.S. Cl. ......................... 119/201; 119/246; 119/17
[58] Field of Search .......... 119/5, 3, 15, 158, 156, 119/17, 19; 47/69

[56] References Cited

U.S. PATENT DOCUMENTS

| 164,074 | 6/1875 | Chase | 119/5 |
|---|---|---|---|
| 1,767,150 | 6/1930 | McCassey et al. | 119/5 |
| 3,098,465 | 7/1963 | Ivey | 119/15 |
| 3,225,738 | 12/1965 | Palencia | 119/17 |
| 3,269,578 | 8/1966 | Lewis | 119/5 |
| 3,699,921 | 10/1972 | Janicek | 119/5 |
| 3,804,064 | 4/1974 | Kuneman et al. | 119/5 |
| 4,122,800 | 10/1978 | Mangarell | 119/5 |
| 4,291,645 | 9/1981 | Cruchelow et al. | 119/19 |
| 4,773,008 | 9/1988 | Schroeder et al. | 119/5 |
| 4,850,306 | 7/1989 | Nitkin | 119/17 |
| 4,958,593 | 9/1990 | Hurlburt et al. | 119/5 |
| 5,009,197 | 4/1991 | Cottell | 119/158 |
| 5,031,572 | 7/1991 | Dana | 119/5 |
| 5,042,425 | 8/1991 | Frost, Jr. | 119/5 |
| 5,134,969 | 8/1992 | Mason et al. | 119/17 |
| 5,135,400 | 8/1992 | Ramey | 119/5 |

FOREIGN PATENT DOCUMENTS

| 52809 | 7/1890 | Fed. Rep. of Germany | 119/17 |
|---|---|---|---|
| 3126930 | 2/1983 | Fed. Rep. of Germany | 119/17 |
| 3842638 | 7/1990 | Fed. Rep. of Germany | 119/17 |
| 1250228 | 8/1986 | U.S.S.R. | 119/18 |

*Primary Examiner*—Gene Mancene
*Assistant Examiner*—Todd E. Manahan
*Attorney, Agent, or Firm*—Sherman D. Pernia

[57] ABSTRACT

A vivarium specifically designed for rehabilitating an aquatic fur-bearing mammal or bird, particularly a sea otter, includes an improved enclosure having large outwardly flared ports covered with soft flexible netting, curved and rounded joints, corners and edges, and surfaces which are smooth and projectionless. An improved swimming environment is sized to allow rehabilitative grooming behavior and an improved dry environment has weight bearing surfaces that do not focus pressure on discrete areas of an enclosed animal's skin. A further feature of the vivarium is that the enclosure and swimming and dry environments are supported on a base and can be nested inside the base for storage or transport.

29 Claims, 3 Drawing Sheets

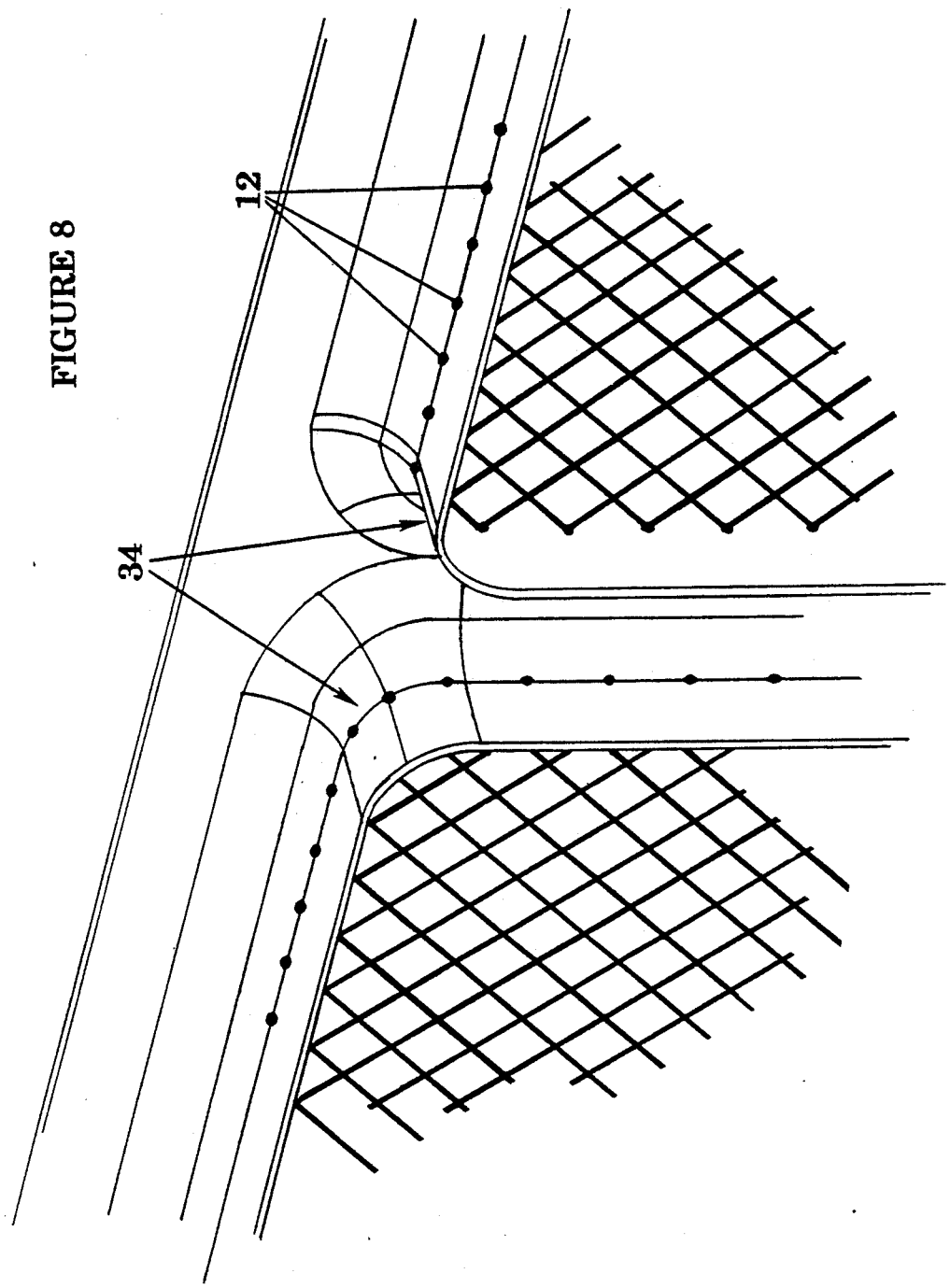

AQUATIC FUR-BEARING MAMMAL AND BIRD VIVARIUM

FIELD OF THE INVENTION

This invention relates to vivariums for maintaining aquatic fur-bearing mammals and birds. More specifically, it relates to vivariums for maintaining sea otters. The present invention also relates to a method for rehabilitating aquatic fur-bearing mammals and birds after exposure to a toxic environment.

BACKGROUND

This invention is the result of my work involved in the rehabilitation of oiled sea otters. The March, 1989 Valdez accident was the first oil spill to involve large numbers of sea otters, as well as other marine birds and mammals. Although to date there has been over a score of larger spills than Valdez, the March, 1989 accident represents the first spill to affect so many sea otters. An estimated 16,000 otters inhabited the area affected by the oil (DeGange, et al. U.S. Fish & Wildlife Service, Sea Otter Symposium, Anchorage, Ak. 1990. Consequently large numbers of the area's sea otters might have been involved (Townsend & Hereman, The Exxon Valdez Oil Spill: A Management Analysis, Cntr. Marine Conserv., DC 1989).

The Sea Otter Rehabilitation Program was developed in response to the need for such a program created by the Valdez spill. The Rehabilitation Program demonstrated that large numbers of oiled sea otters could be successfully rehabilitated following such an incident. However, the experience was often painful and always trying. The state of the art for rescuing, treating and rehabilitating marine animals at the time of the Valdez spill was woefully inadequate to accommodate a rehabilitation response of this nature and magnitude. The Rehabilitation Program led to many new and innovative techniques for treating fur-bearing marine mammals exposed to oil pollution. Prior to this experience, most aspects of the rehabilitation process were speculative and untested. Although break-through developments did occur in course of efforts to deal with the incident, and many stop-gap measures and responses were successful, there remained much need for improvement in many areas of the rehabilitation effort. This especially included a safe, easily storable and transportable means for holding sea otters, and other marine animals, during the course of their rehabilitation.

The present invention addresses the need for an improved holding facility for aquatic animals, particularly aquatic birds and fur-bearing mammals. The present invention embodies several improvements and advantages over cages and holding pens in use prior to and developed during the Valdez incident. The present invention specifically embodies improvements to maintain marine mammals and birds without injury. Additionally, the present invention embodies a vivarium which may be easily stored and readily transported in response to environmental emergency or other need.

SUMMARY

An object of the present invention is a vivarium comprising a swimming environment, a dry environment, and a method for maintaining an aquatic mammal or bird without injury. In addition, it includes a method for easy portability and storage of the vivarium.

A further object of the present invention is a swimming environment comprising a pool constructed integrally with the vivarium that has means for easy draining and filling, that has surfaces which are constructed to facilitate cleaning and maintaining sanitation, and that has means for monitoring and maintaining the quality of the liquid in the swimming environment suitable for an aquatic bird and fur-bearing mammal.

A further object of the present invention is an enclosed dry environment having horizontal, flat surfaces with access for the animal to the swimming environment, means for maintaining the dry environment dry, and having access to the interior of the vivarium and the animal by means of openable and closeable ports.

A further object of the present invention is a method for rehabilitating aquatic mammals and birds, and otters in particular.

A feature of the present invention is a vivarium having: smooth, projection-less surfaces and rounded corners; ports that are flared outward (with or without broad beaded edges); horizontal surfaces having means to stay dry and which surfaces reduce and prevent pressure wound injuries and damage to fur or feathers; port openings screened by means of flexible netting; and is constructed of material that is impervious to animal waste, food, cleaners, pool chemicals, and having surfaces unsupportive of micro-organism growth which may be readily cleaned and disinfected.

A further feature of the present invention is a vivarium assembled of unitized components, which components are constructed of a moldable, solidifiable material, such as fiber glass, carbon fiber, polyester fiber and dacron fiber in combination with epoxy resin.

An advantage of the present invention is a vivarium that is easily portable and storable.

The vivarium will be suitable for maintaining aquatic mammals and birds such as: seals, sea lions, sea otters, river otters, North American river otters, aquatic rodents, and carvers such as gnathion and weasels and all aquatic birds such as cormorants, seagulls and pelicans. The vivarium will be suitable for holding aquatic mammals and birds for emergency rehabilitation following a chemical spill, for other use in the field, for research purposes at academic institutions or private laboratories and for veterinarian care during rehabilitation. Other purposes might include public display for education, and the training of personnel such as animal care specialists for rehabilitation.

Thus in accomplishing the foregoing objects, there is provided in accordance with one aspect of the present invention a vivarium comprising: a swimming environment; a dry environment; means for maintaining an aquatic mammal and bird without injury; and means for easy portability and storage.

Other and further objects, features and advantages will be apparent from the following description of the presently preferred embodiments of the invention, which are given for the purpose of disclosure, when taken in conjunction with the accompanying drawings.

BRIEF DESCRIPTION OF THE DRAWINGS

FIG. 8. Detail showing outward flair of ports and perforations for attaching flexible netting.

Figure 1:
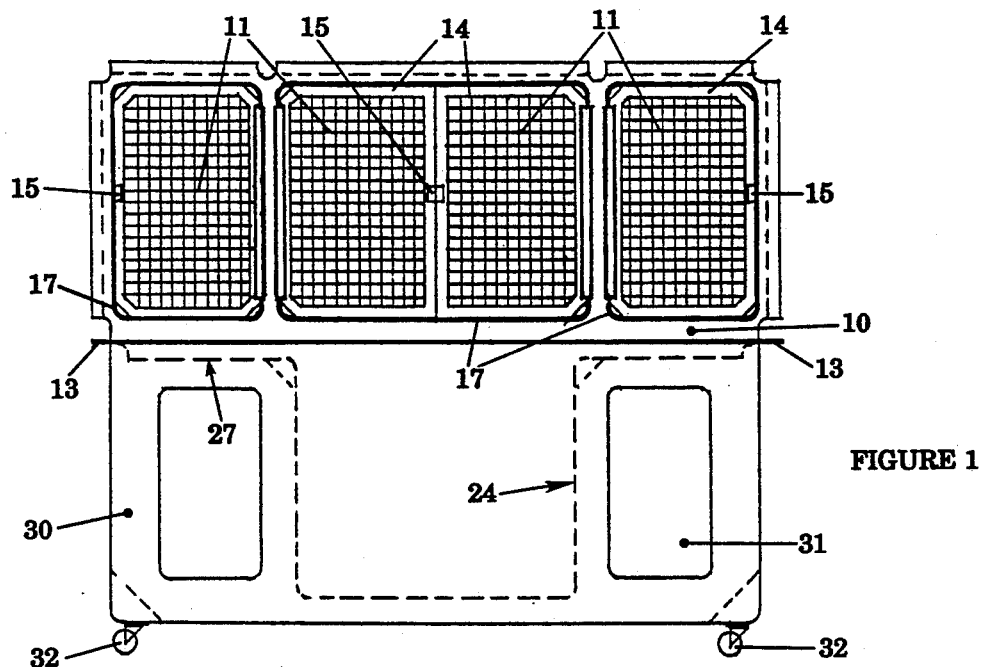
FIG. 1. This is a front elevation. In this embodiment, the back elevation is similar with windows instead of doors.
Figure 2:
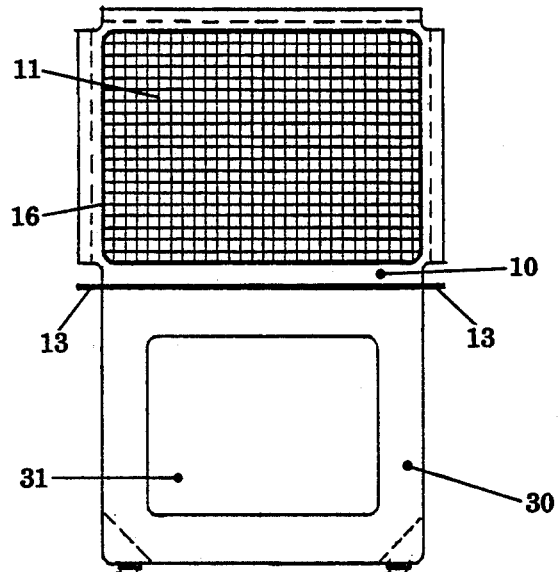
FIG. 2. This is an end elevation. In this embodiment, the vivarium is symmetrical at the center line.
Figure 3:
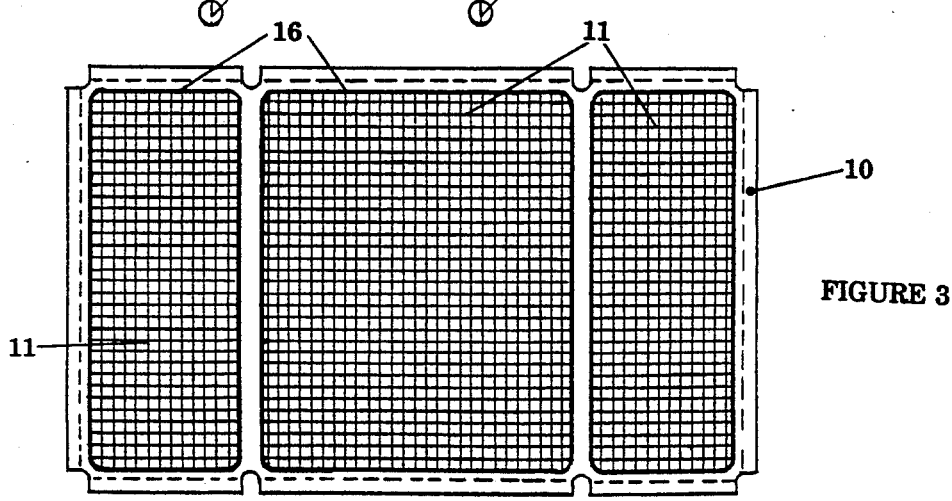
FIG. 3. This is a top elevation.
Figure 4:
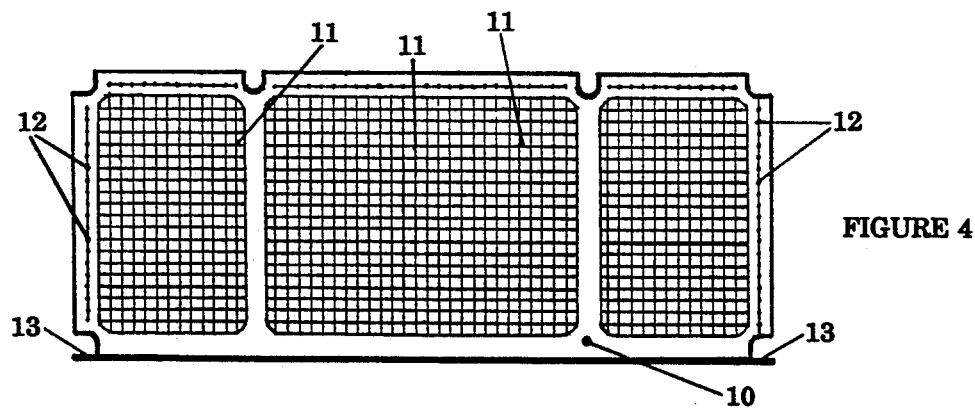
FIG. 4. This is a rear elevation for the top enclosure of the vivarium.
Figure 5:
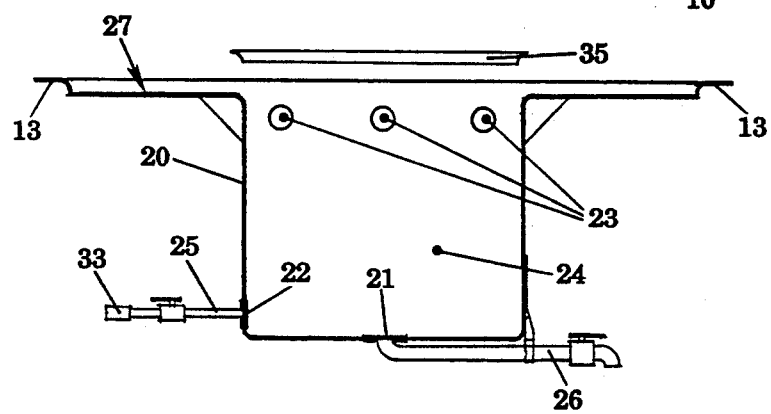
FIG. 5. This is a cross section of the pool and dry environment of the vivarium.
Figure 6:
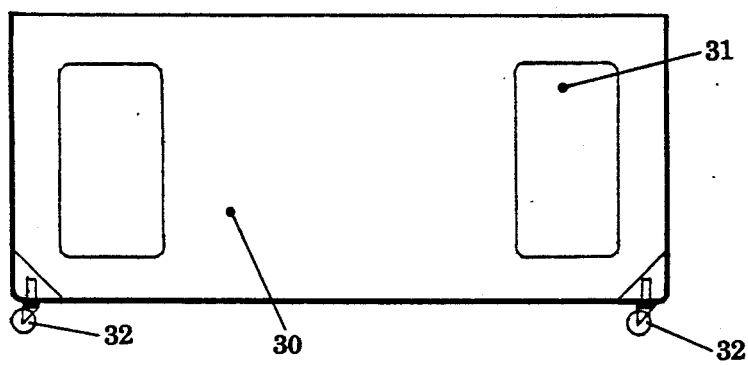
FIG. 6. This is a front and rear elevation of the base of the vivarium.
Figure 7:
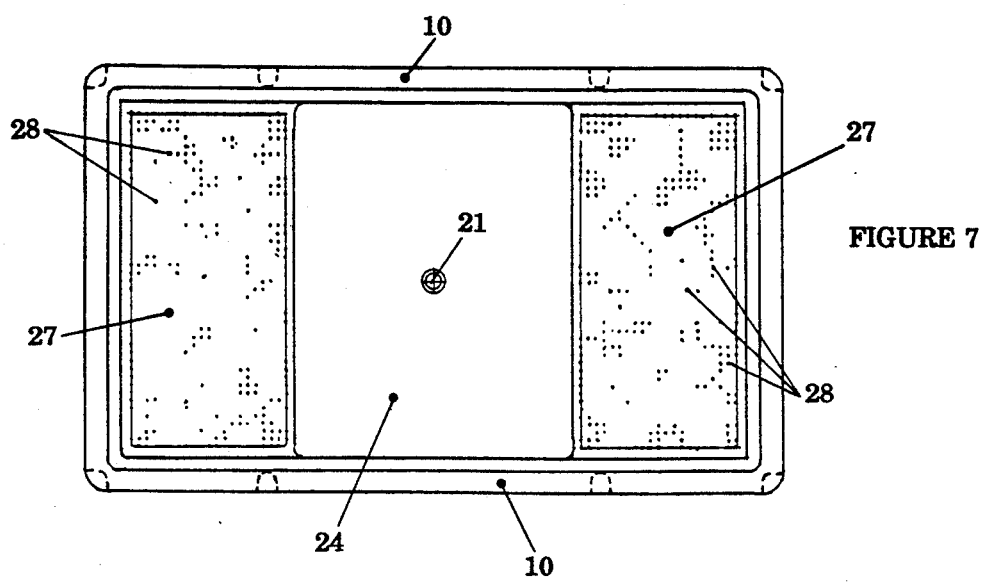
FIG. 7. This is a top elevation through the plan of the pool and dry environment.

Drawings are not necessarily to scale. Certain features of the invention may be shown exaggerated in scale in the interest of clarity and conciseness.

DETAILED DESCRIPTION OF THE INVENTION

While the present invention is herein described, for the purposes of illustration only, it is understood that various substitutions and modifications may be made to the invention without departing from the spirit and scope of the invention. It will be apparent that one skilled in the art will conceive of other embodiments that are within the scope and object of the present invention.

Referring now to the Figures, a vivarium for maintaining sea otters is shown. The vivarium comprises a top enclosure 10 which is detachably connected to a swimming environment 24 and a dry environment 27 by means of a flanged edge 13. The combination 20 of the swimming environment 24 and dry environment 27 attached to the top enclosure 10 rests within and is supported by the base of the vivarium 30. The top enclosure of the vivarium 10 includes ports on the top and sides which function as windows 16 and doors 17. Additionally, door ports 17 are openable and closeable by means of a hinged door 14 and door latch 15. Window ports 16 are screened with flexible netting 11. Hinged doors 14 are also screened by means of flexible netting 11. Ports 16, 17 and doors 14 have an outward flair 34. Window ports 16 and hinged doors 14 have perforations 12 for attaching netting 11. The combination of flexible netting 11 attached by means of the netting perforations 12 to the outward flair 34 of the ports 16, 17 comprise an aspect of the vivarium that prevents injury to the animal. Another feature of this aspect includes outward flair 34 that is broad beaded at its edge.

The swimming environment 24 and the dry environment 27 of the vivarium comprise a unitized component 20. A unitized component being a structural component of the vivarium which incorporate multiple features of the present invention in a single component. Unitized components may be constructed of a moldable, solidifiable material such as fiberglass, carbon fiber, polyester fiber, and dacron fiber in combination with epoxy resin. The dry environment 27 consists of a horizontal flat surface area kept dry by means of perforations 28 that allow liquid to drain from the surface. The perforations 28 in this embodiment are one-quarter inch in diameter, spaced three inches apart, and beveled and deburred to create a smooth edge. The swimming environment 24 comprises a pool constructed integrally with the dry environment 27 as a single, unitized component 20, having a liquid inlet 22 and inlet plumbing 25 for filling, and a liquid drain 21 and drain plumbing 26 for draining. Additionally, overflow outlets 23 are located to maintain the liquid in the pool at a level sufficient to allow an animal to easily climb or jump from the swimming environment 24 onto the dry environment 27 or vice versa. The means for draining (21, 26) and filling (22, 25) from the bottom, from the liquid surface, or from multiple locations may be placed as suits the user.

The base of the vivarium 30 includes removable swivel type castors 32 for easy transport and which may be removed during use or storage. Access ports 31 are included in the base for access to plumbing 25, 26.

An important utility of the present invention is in the rehabilitation of oil exposed sea otters. In a preferred embodiment, the vivarium includes two important features relative to the rehabilitation of sea otters: a dry environment and a swimming environment. A sea otter that has been exposed to oil contamination is in danger from the toxic effects of the oil, and from environmental exposure due to the compromise of it pelage. After an oil contaminated otter is cleaned, it is then ready to be placed into the vivarium, so that it can re-establish the insulating and water repellent features of its fur, and recover from any toxic physiological effects of the oil. An otter may be taken in a net bag to the vivarium. One of the ports is opened and the otter is then placed on the dry environment. If the veterinarian staff is not ready for the otter to use the wet environment, the vivarium has a pool cover 33 can be put into place to prevent the otter from entering the swimming environment. This turns the vivarium into a totally dry environment.

Access to a swimming environment is important in the rehabilitation process. As soon as the otter can remain in water for short periods without becoming hypothermic, the pool cover 33 is removed and the otter is then given access to the swimming environment. Access to and from the swimming environment may be accomplished by means of a ramp, a ladder or other climbing aid, and by maintaining a liquid level sufficient to allow an animal to climb or jump directly from the swimming to the dry environment.

The size of the dry environment and of the size swimming environment are both important features of the present invention. Adult sea otters range from about 24 to 36 inches in standard length (tip of nose to base of tail).

The depth of the swimming environment is a further important feature. Otters of standard length require a pool, the depth of which generally is not less than 24 inches, in order to groom the full length of its body in a normal fashion. Such grooming is critical for the full rehabilitation of the animal. A pool of insufficient depth may not allow the animal to groom adequately. Experience has further shown that the cross-section of a pool to contain two otters preferably should be a least one standard length on each side. The swimming environment is large enough to allow one or two adult sea otters to swim in the pool without contact. It is deep enough to allow a swimming otter to roll and pinwheel while grooming without touching the bottom of the pool. If the swimming environment is not deep enough, the otter will not be able to pinwheel and groom properly while swimming, and this will prevent the full rehabilitation of the animal. In this embodiment, the size of each surface of the dry environment is 38×24 inches. The swimming environment is contained in a volume 36×38 inches in area and 32 inches deep.

The swimming environment has a skimming drain that prevents the accumulation of the debris on the surface of the pool. If not removed, such debris could contaminate the otter's fur. In addition to the skimming drain, the swimming environment has a drain at the bottom to allow the pool to be completely drained of liquid. When the pool is cleaned, the otter is removed from the pool, the bottom drain is opened, and the liquid is drained from the swimming environment. The surfaces are constructed of materials designed to be easily cleaned and impervious to most chemicals and to food used in animal husbandry, e.g., plastics and stainless steel. In particular, plastic components may be constructed of moldable, solidifiable materials such as fiberglass, carbon fiber, polyester fiber, and dacron fiber in combination with epoxy resin.

The dry environment in the preferred embodiment is large enough to allow adult sea otters to recline comfortably without having to bend their bodies. The dry environment is perforated and slightly inclined to allow liquid to drain from the sea otter's fur as soon as it leave the swimming environment. The perforations in the dry environment are to prevent the accumulation of water without causing abrasion and damage to the pelage or plumage of an animal. Such perforations may range for example from 3 to 6 inches apart and be about ¼ inch in diameter. Such perforations distribute the weight of the animal over a large surface area and avoids the concentration of weight on small areas of the skin. The present invention avoids the problems encountered when constructing the dry environment of materials such as hardware cloth, drainage grating or expanded sheet metal.

The top of the swimming environment and dry environment are enclosed by a unitized component which contain the animal. This enclosure features a very specific design which allows the free circulation of air through large ports. These ports are then covered with a flexible netting which is designed to be non-injurious to teeth and gums, because most wild carnivores, especially the young, chew things constantly. In a preferred embodiment, the ports are flared and the netting placed onto the ports in such a fashion so that an otter cannot injure its nose, nor gain a purchase on the outside of the port with a canine tooth. Alternatively, the edge of the flared port may also be broad beaded or the net may be woven into the edge of the port. This aspect is important in preventing injury to the animals teeth.

In the preferred embodiment, the vivarium is designed to hold two sea otters. An important feature of the present invention allows otters to socialize with one another, which my experience has shown has the advantage of enhancing a more rapid completion of the rehabilitation process.

Veterinarian staff can easily gain access to sea otters in the vivarium through the openable ports. In the preferred embodiment, there are three such ports: two on either side which open onto the dry environments, and one large that opens onto the swimming environment. Husbandry staff feed the otters by opening one of the ports, and placing an appropriate food container on the dry environment. The animals may then eat while resting on the dry environment. Once feeding is over, a port is opened and the husbandry staff can remove the container. If food is dropped into the swimming environment the large port can be opened and the food removed from the swimming environment with a small dip net.

In a preferred embodiment, liquid flowing into the vivarium does so through a pipe having a quick disconnect fitting 33. This allows the vivarium to be taken from storage and quickly connected to a liquid source. Suitable liquids for the swimming environment include water, salt water, sea water and brackish water. The fluid of the swimming environment may also contain additives, such as detergents, non-ionic detergents, non-ionic surfactants and oil degrading micro-organisms, if such is called for in the detoxification/rehabilitation protocol.

Because the rehabilitation process may take many weeks, during which the otter will remain in the vivarium until its fur is completely restored, the vivarium is designed to be placed out-of-doors. It is made with materials that are resistant to ultra violet light degradation. In location with bright sunlight, which may be too intense for sea otters, the vivarium has roof pieces that can placed on top of the vivarium to shield the otter from direct sunlight.

While in use, liquid samples may be taken daily to check the quality of the swimming environment. This may be accomplished by opening a port and dipping a small quantity of liquid out the swimming environment and then analyzing its quality (e.g., bacteria count, pH, etc.). Alternatively, a sampling port, such as a valve, may be integrated with the swimming environment or its plumbing. When an animal has completed the rehabilitation process, a port can be opened, and the animal removed from the vivarium (for example, with a long handled dipped net). After removal from the vivarium, the otter may be transferred to its natural environment, or to some other living situation. The vivarium then can be drained, cleaned, and stored until needed.

The vivarium is designed to separate into nestable pieces, which allows for easy storage and transport by reducing the overall size of the vivarium by approximately one-half. All surfaces within the vivarium are smooth and rounded to prevent injury to the animal.

The use of the vivarium for the rehabilitation of otters as just described is also directly pertinent to the rehabilitation of other aquatic mammals and birds. The basic process of rehabilitation is similar to that just described for sea otters.

One skilled in the art will readily appreciate that the present invention is well adapted to carry out the objects and obtain the ends and advantages mentioned, as well as those inherent therein. The aquatic mammal and bird vivarium and the methods described herein are presently representative of preferred embodiments, are exemplary, and are not intended as limitations on the scope of the invention. Changes therein and other uses will occur to those skilled in the art, which are encompassed within the spirit of the invention or defined by the scope of the claims.

What is claimed is:

1. A vivarium for rehabilitating aquatic fur-bearing mammals and birds comprising:

a top enclosure having ports on the top and sides thereof, said ports forming windows and doors; a swimming environment and a dry environment formed as a single component detachably connected to said top enclosure, forming a combination;

said combination having means for preventing injury to said fur-bearing aquatic mammal and bird selected from the group consisting of smooth projection-less surfaces, rounded corners, ports that are flared outward, horizontal surfaces having means to reduce and prevent pressure wound injury and damage to fur and feathers, and port openings screened by means of flexible netting; and a base component supporting said combination.

2. The vivarium of claim 1, wherein said swimming environment comprises a pool.

3. The vivarium of claim 1, wherein said swimming environment comprises a pool having a range of dimensions of:
1 to 8 feet in length;
1 to 8 feet in width; and
1 to 6 feet in depth.

4. The vivarium of claim 1, wherein said swimming environment includes means for draining and filling.

5. The vivarium of claim 1, wherein said swimming environment includes a bottom, said bottom having means for filling and means for draining said swimming environment.

6. The vivarium of claim 1, wherein said swimming environment is filled with liquid.

7. The vivarium of claim 1, further comprising means for closing-off said swimming environment from said dry environment.

8. The vivarium of claim 1, further comprising said swimming environment containing a liquid selected from the group consisting of: water, salt water, seawater, and brackish water.

9. The vivarium of claim 1, further comprising said swimming environment having a liquid containing an additive from the group consisting of: a detergent; a non-ionic detergent; a non-anionic surfactant; and oil degrading micro-organisms.

10. The vivarium of claim 1, wherein said dry environment includes a horizontal, flat surface.

11. The vivarium of claim 1, wherein said dry environment includes a horizontal, flat surface ranging in area from 36 square inches to 128 square feet.

12. The vivarium of claim 1, wherein said dry environment includes access to and from said swimming environment.

13. The vivarium of claim 1, further comprising means for maintaining a liquid level sufficient to allow an animal to move between said swimming and said dry environments.

14. The vivarium of claim 1, wherein said dry environment comprises horizontal, flat surfaces kept dry by one or more means selected from the group consisting of: said surfaces being sufficiently inclined to allow liquid to drain from it; and said surfaces being appropriately perforated to allow liquid to drain from it.

15. The vivarium of claim 1, wherein said dry environment includes horizontal surfaces which are inclined.

16. The vivarium of claim 1, wherein at least one of said ports comprises a door for accessing said dry environment.

17. The vivarium of claim 1, wherein at least one of said ports comprises a door for accessing said swimming and dry environments.

18. The vivarium of claim 1, wherein said means for preventing injury comprises said port openings screened with flexible netting.

19. The vivarium of claim 1, wherein said means for preventing injury comprises a flat surface of said dry environment having perforations that are ⅛ inch to ½ inch in diameter; spaced one inch to 6 inches apart, and whose edges are beveled and smooth.

20. The vivarium of claim 1, wherein said base component has means for easy portability and storage.

21. The vivarium of claim 1, comprising unitized components, which components are constructed of a moldable, solidifiable material.

22. The vivarium of claim 1, comprising said top enclosure and said swimming and dry environments' components constructed of a moldable, solidifiable material selected from the group consisting of fiberglass, carbon fiber, polyester fiber and dacron fiber in combination with epoxy resin.

23. A vivarium for maintaining and rehabilitating a sea otter comprising:
a top enclosure having ports on the top and sides, said ports forming windows and doors, said top enclosure having smooth surfaces, rounded corners, and said ports having an outward flair and screened with flexible netting;
a unitized component part detachable connected to said top component, said unitized component further comprising a swimming environment and a dry environment;
said swimming environment further comprising a pool ranging from about 24 inches to 36 inches in each dimension, containing a liquid selected from the group consisting of water, salt water, seawater and brackish water, said liquid containing an additive selected from the group consisting of a detergent, a surfactant and oil degrading micro-organisms;
said dry environment further comprising a substantially horizontal flat surface having an area of at least 24 inches by 38 inches per otter, and having perforations with beveled edges about one-quater inch in diameter, spaced about three inches apart, and said dry environment allowing access to and from said swimming environment; and
a base component supporting said combination and said base component having detachable casters on the bottom thereof, whereby said vivarium may be broken into components for easy portability and storage.

24. A method of rehabilitating contaminated aquatic fur-bearing mammals or birds comprising:
providing a vivarium having a top enclosure with closable ports on the top and sides thereof, a swimming environment and a dry environment, the swimming environment and the dry environment being detachably connected to the top enclosure, and a base supporting the top enclosure, swimming environment and dry environment thereon;
containing an aquatic mammal or bird in said vivarium;
maintaining said aquatic mammal or bird in said vivarium and providing rehabilitating care therefor; and
transferring said aquatic mammal or bird to a natural living environment upon completion of said rehabilitating care.

25. The method of claim 24 further comprising the step of providing initial acute care and cleaning of said aquatic mammal or bird prior to containment thereof in said vivarium.

26. The method of claim 25 wherein said aquatic mammal or bird comprises an oil contaminated aquatic mammal or bird.

27. The method of claim 24 wherein said aquatic mammal or bird is selected from the group consisting of mustelids, pinnipeds, and carnivores.

28. The method of claim 24 wherein said aquatic mammal or bird is a sea otter.

29. The method of claim 24 wherein said aquatic mammal or bird is a penguin.

* * * * *